Aug. 6, 1940.   C. L. NIELSON   2,210,540
FOLDING AUTOMOBILE BED AND TENT
Filed Jan. 16, 1939   2 Sheets-Sheet 1
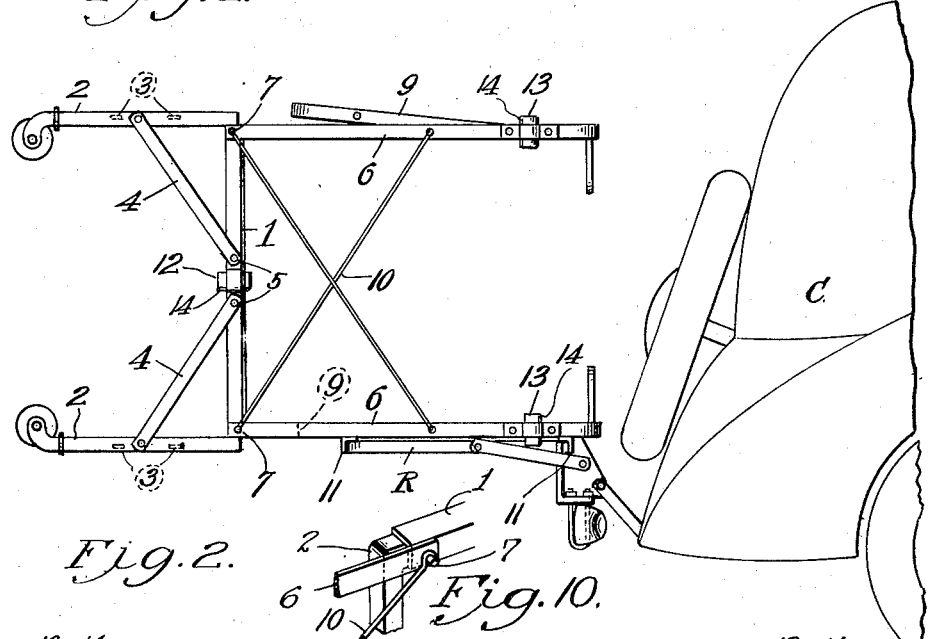
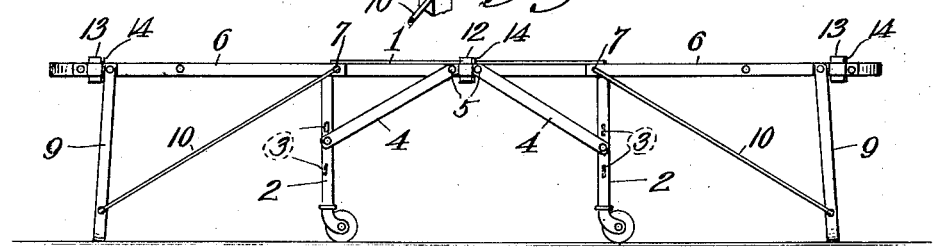
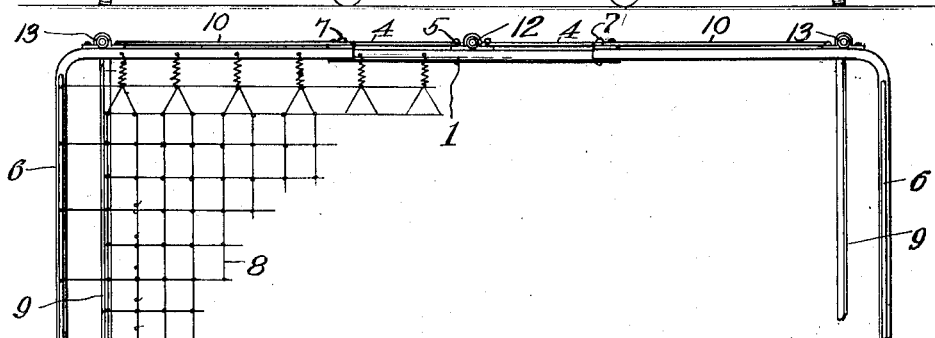

Aug. 6, 1940.  C. L. NIELSON  2,210,540
FOLDING AUTOMOBILE BED AND TENT
Filed Jan. 16, 1939  2 Sheets-Sheet 2
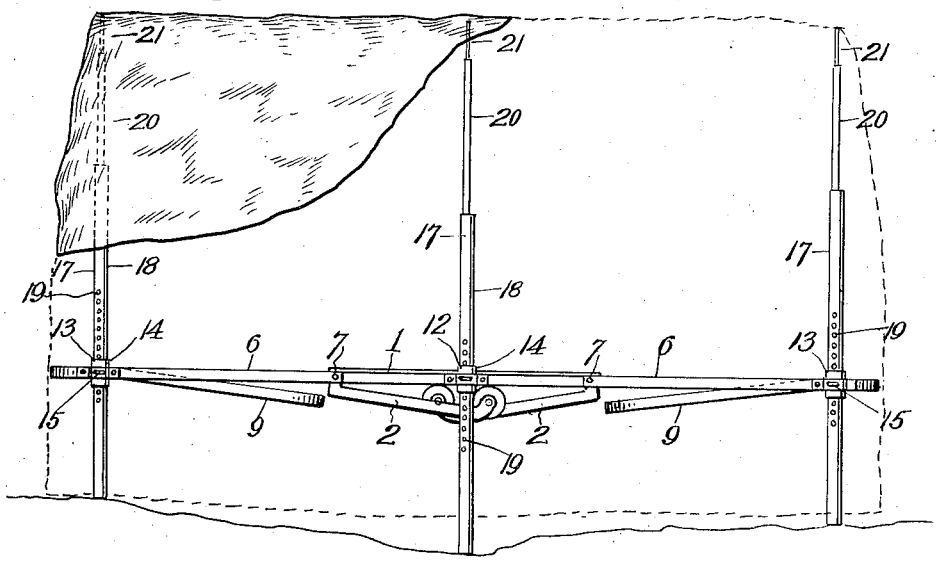
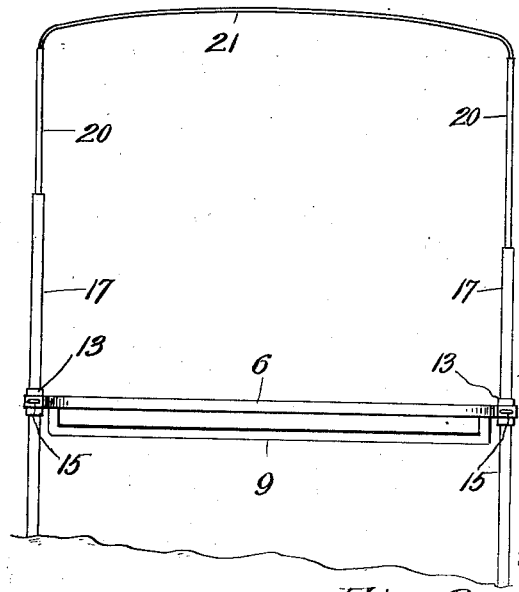
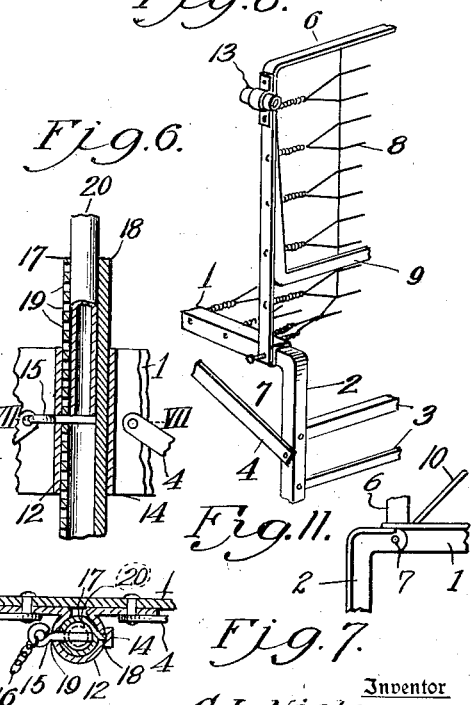
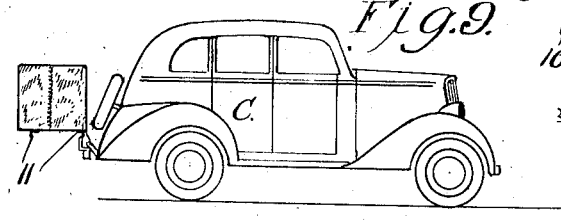
Inventor
C. L. Nielson
By Thorpe & Thorpe
Attorneys Patented Aug. 6, 1940

2,210,540

UNITED STATES PATENT OFFICE 2,210,540

FOLDING AUTOMOBILE BED AND TENT

Clarence L. Nielson, Kansas City, Mo.

Application January 16, 1939, Serial No. 251,119

4 Claims. (Cl. 5—113)

This invention relates to portable folding beds, and more especially to so-called touring auto beds susceptible of being folded to relatively small and compact form for convenient attachment to and carriage by the rear end of a motor car, and the object of the invention is the provision of a bed which may continue its attachment to the car while serving as a bed, or which, detached from the car may be conveniently employed as an indoor bed or as an outdoor bed, either with ordinary leg supports or with special ground-accommodating adjustable legs.

Special objects in mind are to provide extensible detachable legs for use where the ground is rough or sloping to insure that the bed itself shall be horizontal and at any desired heighth, and to serve as supports for transverse arches over which to drape a protective tent, mosquito netting, or the like.

A further object of the invention is to produce in combination with the adjustable legs, a frame or canopy supporting element which is invariably positioned the same height above the bed regardless of the extension of the legs so that head-room will be supplied for the occupant and the tent or canopy will be in horizontal position.

With the general objects named in view and others as will hereinafter appear, the invention consists in certain novel and useful features of construction and combination of parts as hereinafter described and claimed; and in order that it may be fully understood, reference is to be had to the accompanying drawings, in which:

Figure 1 is a view showing a folded bed embodying the invention, attached to the rear end of a motor car, the pivoted legs being in unfolded or open position.

Figure 2 is a side view of the bed in opened condition and as supported by foldable legs and wing-frame legs.

Figure 3 is a fragmentary plan view of the bed as disposed in Figure 2, but omitting certain grooved ribs illustrated in enlarged detail figures.

Figure 4 is a side elevation of the opened bed as equipped with removable extensible legs and means for supporting protective tent or mosquito-excluding equipment.

Figure 5 is a left-hand end view of the bed, as disclosed in Figure 4.

Figure 6 is an enlarged fragmentary vertical section showing a type of construction of the extensible leg feature.

Figure 7 is a horizontal section on the line VII—VII of Figure 6.

Figure 8 is a fragmentary perspective view of part of the framework of the bed.

Figure 9 is a side elevation of the equipment enclosed in a canvas or other suitable cover as it will appear when packed for travel, the folding legs shown in Figure 1 having been collapsed and secured in the positions shown in Figure 4.

Figure 10 is a detail perspective view showing the pivotal connection between the side frame and end frame and a leg as they are shown in Figure 2.

Figure 11 is a detail elevation of the opposite side of the construction shown in Figure 10, but with certain parts in different positions.

In the said drawings, a pair of parallel side bars 1 are pivotally mounted upon legs 2 adapted at times to form ground-engaging supports. The legs at corresponding extremities of the side bars, are secured for conjoint movement by transverse bars 3, and when in ground-engaging or supporting position, are tied to their respective side bars by upwardly-converging braces 4, which are detachably bolted to the side bars as at 5.

A pair of U-shaped end frames 6 are pivoted at 7 to the side bars for disposal at right angles to or in horizontal alinement with the side bars. A suitable flexible mattress support or spring 8, preferably of linked wire fabric is supported by helical springs secured marginally to the side bars and end frames. Pivotally secured near the ends of each end frame is a U-shaped wing frame 9 which may be collapsed flatwise against the respective end frame, or may depend vertically therefrom if it is desired to utilize said wing frames to serve as end legs or supports, for example, when the bed is indoors and needs no canopy, or is out of doors when weather conditions are favorable and the ground is comparatively level. To guard against collapse of the wing frames when serving as legs, brace rods 10 pivoted to the side bars near their ends, are detachably secured to the wing frames remote from their points of pivotal connection with the respective end frames. When the bed is folded, the wing frames are folded flatly against the end frames and so secured in any suitable manner, especially when the car is in motion, to prevent the uppermost wing from scraping or rattling contact with the bed spring 8, and to uphold the other wing from dragging on the ground, although the latter, if resting upon a trunk-rack or other support, cannot swing downwardly as will be apparent by reference to Figure 1. When the end frames are at right angles to the side bars, that is, in folded position, see Figure 1, the said rods are disposed crosswise and detached from the wing frames and engaged with the end frames at the opposite ends of the side bars to which the rods are respectively pivotally secured.

When the bed is secured to a motor car C, by securing one of the end frames flatly to the horizontal trunk-rack R, for example, or preferably to a pair of cross bars 11 secured to the rack R and of length to correspond approximately to the width of an end frame, the folding operation can be effected by swinging the other end frame to vertical position at right angles to the side bars, and then swinging the latter at right angles to the end frame secured to the trunk rack, which action places the first-named end frame in a horizontal position above and spaced from the end frame fastened to the trunk-rack, see Figure 1. The rods 10 are then crossed and secured as explained above, to the end frames, the space between the latter, the side bars and the rear end of the car, serving to hold a rolled or folded bed mattress, pillows, poles, tent and other equipment, not shown. In this connection, it will be noted, that by detaching the braces 4 from the side bars, the legs 2 can be swung to collapsed position adjacent the side bars and so secured in any suitable manner, it being obvious that collapsing of the legs is necessary for the sake of appearance as well as for compactness and the minimizing of the chance of side-swiping cars or pedestrians, especially in rounding corners, and to prevent excessive projection of the bed structure to comply with state laws.

It is desirable to support the bed horizontally in opened condition when the ground is sloping or uneven, or when it is desired to utilize a canopy or tent or mosquito-excluding enclosure, or merely to support the bed at a higher or lower level than the regular legs 2 and wing-frames 9. To accomplish this result, each side bar is provided midway its length, with a fixed sleeve 12 disposed perpendicularly to the side bar. A similar pair of sleeves 13 are secured to the end frames remote from the pivotal points thereof, and said sleeves also stand cross-wise of said frames so that when the bed is in opened condition, all of said sleeves occupy vertical positions. Each sleeve, if circular in cross section, may be formed with an internally-grooved rib 14, and has a perforation for the reception of a pull-pin 15, which may be secured to a guard chain 16 to prevent loss, the other end of the chain being secured to any suitable part of the bed.

A standard for fitting slidably through, but non-rotatable relative to each sleeve, and shown as a relatively long tube 17, has a rib 18 engaging the respective groove, and a longitudinal series of perforations 19. By selection, any desired perforation 19 can be brought into register with the sleeve perforation, by adjustment of the tube, and the parts are secured in such relation by fitting the pull-pin 15 through the registering perforations in the sleeve and tube. It will thus be seen that proper adjustment of all of the standards enables the operator to dispose the bed in a horizontal position regardless of the slope or roughness of the ground (see Figure 4), and that through the same instrumentalities, the bed can be set at the desired heighth. When supported by the standards 17, the legs 2 and the wing-legs 9, are folded against the body framework or they may be detached, as they are functionless when said standards 17 support the bed. If the legs 2 are of conjoint length greater than the side bars to which they are attached, they can be folded to inoperative overlapping position (see Figure 4), as they are pivoted to the side bars for such purpose.

To support a tent, canopy or the like (see Figure 4), over the bed and to automatically position the supporting frame therefor at the same height above the bed regardless of the degree of extension of the legs or standards 17, a series of rods 20, preferably tubular, are adapted to be fitted telescopically in the standards 17, and they rest at their lower ends on the pull-pins 15. Each pair of said rods on opposite sides of the bed, detachably receive the arms of a spring-metal arch 21. With the parts arranged as described, a canvas tent or canopy, or the like, may be spread over the arches (see Figure 4). When privacy is desired and also to protect the bed against inclement weather, the walls of the tent should be extensive enough to give full coverage close to the ground. When preparing for travel the canopy or tent can be stored within the rolled up equipment, if desired, along with the standards 17 and other equipment. After all of the parts have been folded, including the legs 2 as shown in Figure 4, the entire bed and auxiliary equipment stored within the bed, may be housed against loss and protected from the weather and dust by being covered with a suitable canvas cover such as shown in Figure 9.

From the above description it will be apparent that I have produced a construction embodying all of the features of advantage set forth as desirable, and while I have described and illustrated the preferred embodiment, it is to be understood that I reserve the right to all changes within the spirit of the invention and without the ambit of the prior art.

I claim:

1. In a folding bed, parallel side bars, U-shaped end frames pivoted to the opposite ends of the side bars for disposal vertically upwardly or horizontally outward, a flexible fabric secured at its ends to the end portions of the end frames, and at its sides to the side arms of the end frames and to the side bars, vertically disposed sleeves secured to the side bars midway the length thereof, sleeves secured to the arms of the end frames and standing vertically when the said frames are horizontally disposed, upright standards adjustably secured in said sleeves, separate means on the side bars and end frames at about the same level, for securing the standards against slippage through the sleeves, corresponding rods fitting the standards telescopically and limited in downward movement by the said means, and transverse arches detachably secured at their ends to the upper ends of opposite sets of said rods.

2. In a folding bed, parallel side bars, U-shaped end frames pivoted to opposite ends of the side bars for disposal in the same horizontal plane as the side bars or perpendicularly thereto, a flexible mattress support connected to the side bars and end frames, opposite pairs of sleeves secured to the side bars and side arms of the U-shaped frames and standing upright when the side bars and U-frames occupy substantially the same horizontal plane, standards extending through said sleeves and adapted for resting upon the ground, separate means for securing the standards to the sleeves to support the side bars and end frames horizontally, rods slidably secured to the standards and each resting at its lower end upon one of said means, and transverse arches detachably secured at their ends to opposite sets of the rods resting upon said means.

3. In a folding bed, parallel side bars, U-shaped end frames pivoted to opposite ends of the side bars for disposal in the same horizontal plane as the side bars or perpendicularly thereto, a flexible mattress support connected to the side bars and end frames, opposite pairs of sleeves secured to the side bars and side arms of the U-shaped frames and standing upright when the side bars and U-frames occupy substantially the same horizontal plane, upright non-rotatable standards adjustable vertically in said sleeves, means carried by the side bars and end frames for interlocking engagement with said standards, rods slidable on the standards and limited in movement in one direction by said standard-interlocking means, and transverse arches for detachable connection at their ends to opposite sets of the said rods.

4. In a folding bed, parallel side bars, U-shaped end frames pivoted to opposite ends of the side bars for disposal in the same horizontal plane as the side bars or perpendicularly thereto, a flexible mattress support connected to the side bars and end frames, opposite pairs of sleeves secured to the side bars and side arms of the U-shaped frames and standing upright when the side bars and U-frames occupy substantially the same horizontal plane, standards extending through said sleeves and adapted for resting upon the ground, separate means for securing the standards to the sleeves to support the side bars and end frames horizontally, rods slidably secured to the standards and each resting at its lower end upon one of said means, transverse arches detachably secured at their ends to opposite sets of the rods resting upon said means, and a tent for fitting over the arches and enclosing the side bars and end frames.

CLARENCE L. NIELSON.